(12) United States Patent
Law et al.

(10) Patent No.: US 8,365,171 B2
(45) Date of Patent: Jan. 29, 2013

(54) I/O AGENT ASSIGNMENT FOR JOBS USING AN MPI LIBRARY

(75) Inventors: Ellick Chi-Lick Law, Woodstock, NY (US); Haizhu Liu, Poughkeepsie, NY (US); Richard Roy Truemann, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/728,781

(22) Filed: Mar. 22, 2010

(65) Prior Publication Data
US 2011/0231845 A1    Sep. 22, 2011

(51) Int. Cl.
*G06F 9/46* (2006.01)
*G06F 15/173* (2006.01)

(52) U.S. Cl. ........ 718/100; 718/102; 718/103; 718/104; 718/106; 709/223; 709/224; 709/226

(58) Field of Classification Search .................. 718/100, 718/102, 103, 104, 106; 709/223, 224, 226
See application file for complete search history.

(56) References Cited

U.S. PATENT DOCUMENTS

| | | | | |
|---|---|---|---|---|
| 2003/0182349 A1* | 9/2003 | Leong et al. | .................. | 709/100 |
| 2005/0131865 A1* | 6/2005 | Jones et al. | ........................ | 707/2 |
| 2006/0206884 A1* | 9/2006 | Creamer et al. | .............. | 717/147 |
| 2007/0174558 A1* | 7/2007 | Jia et al. | ........................ | 711/147 |
| 2007/0223483 A1* | 9/2007 | Huang et al. | .................. | 370/394 |
| 2008/0244590 A1* | 10/2008 | Chambliss et al. | ........... | 718/102 |
| 2009/0064168 A1* | 3/2009 | Arimilli et al. | ............... | 718/105 |
| 2009/0254917 A1* | 10/2009 | Ohtani | .......................... | 718/104 |
| 2009/0271152 A1* | 10/2009 | Barrett | .......................... | 702/186 |
| 2009/0271799 A1* | 10/2009 | Barsness et al. | .............. | 718/106 |
| 2010/0082938 A1* | 4/2010 | Duvalsaint et al. | ............. | 712/13 |

OTHER PUBLICATIONS

Aioyama, et al., "RS/6000 SP:Practical MPI Programming", IBM International Tech Support Organization, Aug. 1999, US.
Prost, et al., "MPI-I/O/GPFS, An Optimized Implementation of MPI-IP on top of GPFS", Association for Computing Machinery, SC2001, Denver, CO, 2001.

* cited by examiner

*Primary Examiner* — Emerson Puente
*Assistant Examiner* — Charles Swift
(74) *Attorney, Agent, or Firm* — Mitch Harris, Atty at Law, LLC; Andrew M. Harris; Matthew W. Baca (57) ABSTRACT

An MPI library including selective I/O agent assignment from among executing tasks, provides improved performance. An MPI job is made up of a number of tasks. I/O operations in an MPI job are performed by tasks assigned as I/O agents. I/O agents are assigned such that the number of tasks assigned as I/O agents are less than the total number of tasks that make up the MPI job. In a dynamic MPI job, I/O agents may be selected from among tasks executing on a lead world or may be spread across multiple worlds. To perform I/O operations initiated by any tasks of an MPI job, including tasks not assigned as I/O agents, the MPI library instantiates worker threads within the tasks assigned as I/O agents. Once the tasks are assigned as I/O agents, identity information of the I/O agents may be stored so that a repeat assignment is not necessary.

20 Claims, 7 Drawing Sheets

I/O AGENT ASSIGNMENT FOR JOBS USING AN MPI LIBRARY

This invention was made with Government support under HR0011-07-9-0002 by the Defense Advanced Research Projects Agency (DARPA). The Government has certain rights in this invention.

BACKGROUND OF THE INVENTION

1. Field of the Invention

The present invention is related to large scale computer processing, and more specifically distributed computing using libraries such as Message Passing Interface (MPI) Distributed libraries.

2. Description of Related Art

In large-scale distributed computer systems, such as those using an MPI library, to perform input and output operations, file accesses are performed by input/output (I/O) agents. An MPI job is executed by a number of tasks. The tasks are individual processes that carry out the operations required by the MPI job. Traditionally, every task is an I/O agent. The library assigns I/O operations to I/O agents in a round robin fashion, with each I/O agent handling a different portion of the file the I/O operations are accessing.

Assigning every task as an I/O agent works effectively when an MPI job has a small number of tasks. As the number of tasks in an MPI job increases, the performance deteriorates because of the overhead required by the library to coordinate I/O operations. Performance may also deteriorate because there may be many I/O agents performing I/O operations on the same compute node(s) of a system at the same time and these I/O agents will compete for the same set of computer resources. For example, if I/O agents executing on a particular compute node are simultaneously assigned to handle I/O operations on corresponding portions of a large file, such as a database, these I/O agents will compete with each other for processor execution resources, access to the network disk control unit, and other computer resources. Further, for I/O operations involving large files, wait states can occur in the MPI job. If many or all of the tasks in an MPI job are performing I/O operations on a large file, the tasks may not be able to perform other operations required by the MPI job, until the tasks finish their I/O operations. In dynamic MPI jobs, i.e., those involving the instantiation of one or more additional groups of tasks, referred to as "worlds," after the MPI job has begun, fixed I/O agent assignment is not practical since the number of tasks can increase or decrease after the job has begun, and therefore an optimal allocation of I/O agents cannot be predetermined.

Therefore, it would be desirable to provide a method and system to selectively assign tasks in an MPI job as I/O agents to improve performance. Further, it would be desirable to provide a method for selectively assigning tasks as I/O agents in a dynamic MPI job in order to perform I/O operations using tasks that did not exist at the initialization of the job, and for performing I/O operations for worlds that did not exist at the initialization of the job.

BRIEF SUMMARY OF THE INVENTION

The invention is embodied in a computer-performed method, a computer program product and a computer system that assigns tasks as I/O agents in an MPI job. The I/O agents are tasks designated to perform I/O operations The method, which is implemented by the computer program product and computer system that implements an MPI library, allows the number of I/O agents in the MPI job to be less than the number of tasks in the job. The MPI job is made up of a number of tasks that are executed within one or more worlds. Instead of assigning every task as an I/O agent, only some tasks are assigned as I/O agents that perform I/O operations of the job. Once tasks are assigned as I/O agents, the MPI library instantiates worker threads within the tasks assigned as I/O agents to perform the I/O operations. When an I/O operation is required by any task of the MPI job, the I/O request is performed by a worker thread of a task assigned as an I/O agent.

Before tasks are assigned as I/O agents, the MPI library may determine whether I/O agents have been previously assigned. If so, the previous assignment may be used. The tasks assigned as I/O agents may perform I/O operations such as file I/O operations on a file opened by the MPI job, communication operations such as network I/O operations, or any other I/O operations.

The foregoing and other objectives, features, and advantages of the invention will be apparent from the following, more particular, description of the preferred embodiments of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to the assignment of I/O agents among tasks in MPI jobs executing in distributed computer systems, and specifically, algorithms for assigning I/O agents in both static and dynamic MPI jobs. The I/O agents are selectively assigned to improve performance. For static MPI jobs, the number of tasks assigned as I/O agents is less than all of the tasks in the MPI job. For example, an MPI job executing several tasks on multiple compute nodes may assign one I/O agent per compute node from among the tasks executing on the same compute node. In a dynamic MPI job, a lead world among several worlds, which are groups of tasks, may be determined if none has been specified, and the I/O agents are selected from tasks in the lead world, such as by assigning one I/O agent per compute node of the lead world. Alternatively, the I/O agents can be spread across multiple worlds. For either static or dynamic MPI jobs, once the tasks are assigned as I/O agents, the identity of the I/O agents is stored, so that a previous assignment can be reused when a file is opened or another communication process is started.

Figure 1:
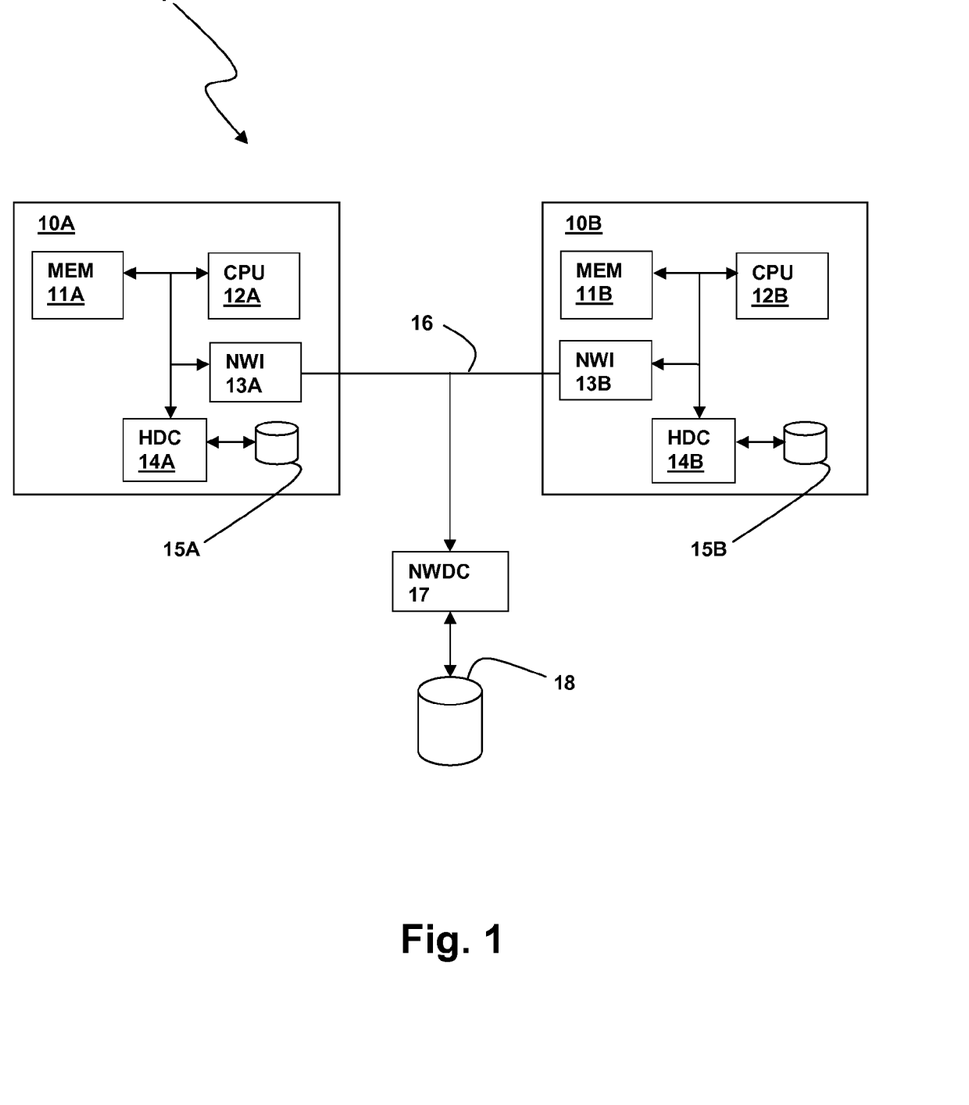
FIG. 1 is a top level diagram of a computer system 1 in which techniques according to the embodiments of the present invention are practiced.

Referring now to FIG. 1, a distributed computer system 1, in which embodiments of the present invention are practiced, is shown. A first compute node 10A of distributed computer system 1 includes a processor (CPU) 12A coupled to a memory (MEM) 11A that stores program instructions for execution by processor 12A. Compute node 10A also includes a hard disc controller (HDC) 14A that interfaces processor 12A to a local storage device 15A, and a network interface (NWI) 13A that couples compute node 10A to network 16, which may be fully wireless, fully wired, or any type of hybrid network.

A second compute node 10B also includes a processor (CPU) 12B, a memory (MEM) 11B, a network interface (NWI) 13B, a hard disc controller (HDC) 14B, and a local storage device 15B. Second compute node 10B operates in the same manner as first compute node 10A. Compute nodes 10A and 10B are coupled together through network 16, and are also coupled to a file storage device 18 through a network disc controller (NWDC) 17. When an MPI job is executed in distributed computer system 1, the tasks of the job are spread across compute nodes 10A and 10B. The tasks of compute nodes 10A and 10B communicate with one another through message passing by making calls to functions provided by the MPI library. The resources of distributed computer system 1 are shared by the tasks of compute nodes 10A and 10B using message-passing communication, so that performance is enhanced.

Although only two compute nodes 10A and 10B are illustrated, distributed computer system 1 will generally include a large number of compute nodes. Additional file storage devices will generally be included and coupled to network 16 though other network disc controllers. Network 16 may include wireless local area networks (WLANs), wired local-area networks (LANs), wide-area networks (WANs) or any other suitable interconnection that provides communication between compute nodes 10A and 10B, file storage device 18, and any other systems and devices coupled to network 16. Although FIG. 1 is illustrative of a particular computer system in which the invention is practiced, the present invention concerns I/O agent assignment that is not limited to a specific computer system or network configuration. The objects or interfaces of distributed computer system 1 assign tasks as I/O agents according to methods and structures of the present invention, as described in further detail below.

Figure 2:
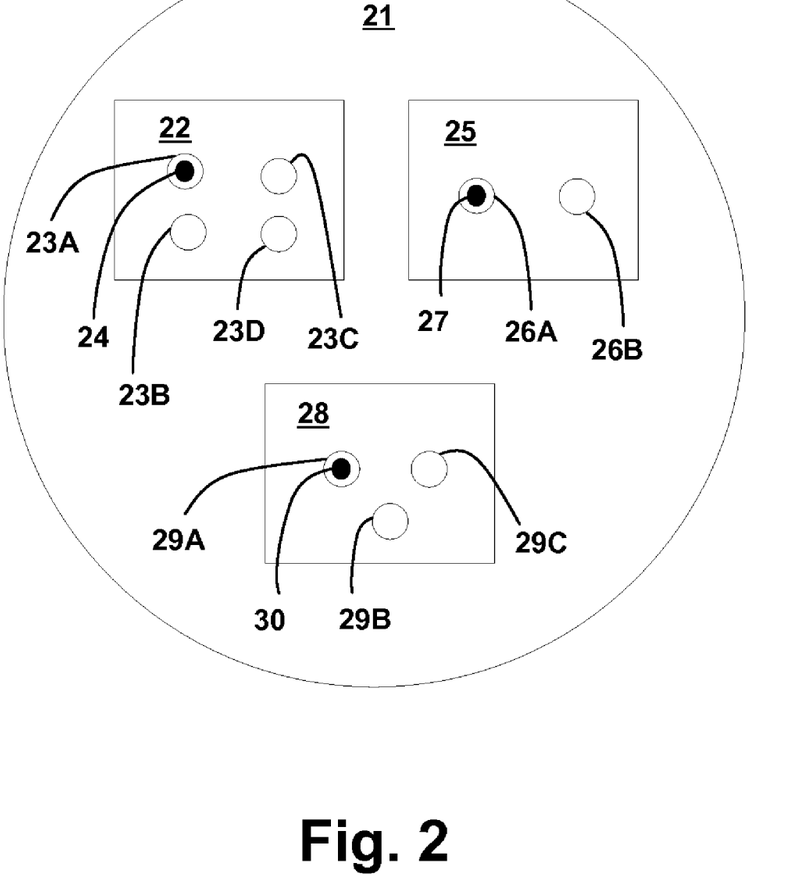
FIG. 2 is a pictorial diagram illustrating a single-world MPI job 21 executing within a computer system in which techniques according to the embodiments of the present invention are practiced.

Referring now to FIG. 2, a pictorial diagram showing a single-world MPI job 21 executing within the computer system of FIG. 1 is illustrated. Single-world MPI job 21, which is a static MPI job, is made up of a number of tasks executing on several compute nodes. All tasks in MPI job 21 are in existence at the beginning of MPI job 21 and the task count does not increase once the execution of MPI job 21 begins. In the illustrative example, MPI job 21 executes on three compute nodes 22, 25 and 28. Each compute node in MPI job 21 has a structure similar to compute nodes 10A and 10B in FIG. 1. Compute node 22 executes four tasks 23A-D, compute node 25 executes two tasks 26A-B, and compute node 28 executes three tasks 29A-C. In each of compute nodes 22, 25, and 28, certain tasks 23A, 26A, and 29A are assigned as I/O agents 24, 27 and 30, respectively. Tasks 23B-D, 26B and 29B-C which are not assigned as I/O agents do not perform I/O operations directly. Instead, I/O operations required by tasks 23B-D, 26B and 29B-C that are not assigned as I/O agents are submitted to tasks 23A, 26A, and 29A that are assigned as I/O agents 24, 27 and 30, which will be explained in more detail below. For an I/O operation required by one of tasks 23A, 26A, or 29A that are assigned as an I/O agents 24, 27, or 30, the I/O operation may be performed by the I/O agent task itself, or may be performed by another task 23A, 26A, or 29A that is assigned as an I/O agent 24, 27, or 30. In the illustrative example, one I/O agent is assigned per compute node 22, 25 and 28 of MPI job 21. However, the number of I/O agents assigned in an MPI job may be greater than one agent per compute node. Further, the number of compute nodes and tasks are not limited to the illustrations. For simplicity, only three compute nodes and nine total tasks have been shown in MPI job 21, but an MPI job generally will include a large number of compute nodes and tasks.

Within MPI job 21, a file is opened with a call to MPI_File_open( ) using an input communicator and a file name. The input communicator stores task distribution information for each world connected by the communicator. The input communicator also stores I/O agent identification information. The identification may be stored in an array of I/O agent IDs, which is attached to the input communicator. The I/O agent ID array stores the identity of tasks that have been previously assigned as I/O agents in MPI job 21, as described below. Each I/O agent ID array has a reference count, indicating the number of communicators referencing the I/O agent ID array. When a file is opened using the input MPI communicator, a duplicate communicator of the input communicator is instantiated by the MPI_Comm_dup( ) function. Any additional file open requests result in an additional duplicate communicator being instantiated. Each duplicate communicator references the I/O agent ID array in the same manner that the input communicator references the I/O agent ID array. When a file is closed, the duplicate communicator is freed, resulting in a decrement of the reference count of the I/O agent ID array. For example, when an input communicator is used to open one file, the agent ID array will initially have a reference count of two, because a duplicate communicator has been instantiated. If the same input communicator is used to open another file without closing the first, then the I/O agent ID array will have a reference count of three, due to the instantiation of a second duplicate communicator. When both files are closed, the reference count of the I/O agent ID array is decremented to one, because the two duplicate communicators have been freed, but the input communicator remains.

As long as the reference count of the I/O agent ID array is greater than zero, the I/O agent ID array is considered active and the identities of tasks assigned as I/O agents will be available for future I/O operations. Whenever a file is opened, the I/O agent ID array attached to the input communicator used to open the file may be checked to determine if I/O agents have been previously assigned. If so, the tasks previously assigned as I/O agents may be used again to perform file operations on the newly opened file. If the reference count of the I/O agent ID array becomes zero, then the I/O agent ID array is discarded. The reference count can be reduced to zero with a call to free the input communicator. However, as long as the input communicator is not freed, the I/O agent ID array is considered active and the tasks assigned as I/O agents can be used to perform I/O operations in satisfaction of the I/O requests for MPI job 21.

Figure 3:
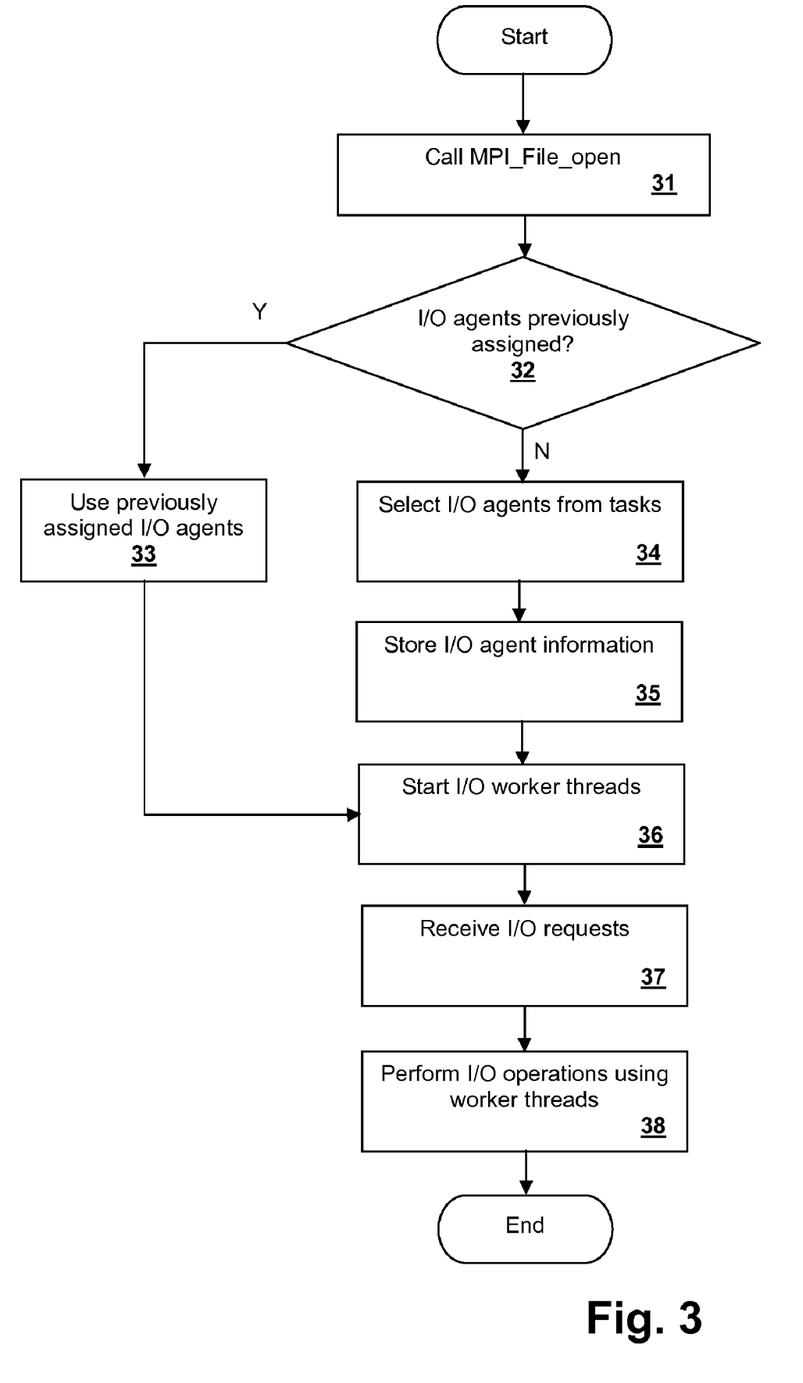
FIG. 3 is a flowchart of a method in accordance with an embodiment of the present invention.

Referring now to FIG. 3, a method in accordance with an embodiment of the present invention is illustrated in a flowchart. In the depicted method, a file is opened with a call to MPI_file_open( ) (step 31). If I/O agents have been previously assigned in an MPI job (decision 32), then the assignment process is skipped and the previous assignment of I/O agents is used (step 33). However, if there has not been a previous assignment of I/O agents in the MPI job, then the I/O agent assignment must select which tasks will be assigned as I/O agents (step 34). The assignment may be performed in several different ways representing different embodiments of the present invention. For example, if the MPI job selects one I/O agent per compute node of the world in which the MPI job is executed, then the total number of I/O agents will be the total number of compute nodes in the world, as illustrated in FIG. 2. Alternatively, the MPI job may specify that all the tasks are assigned as I/O agents. Further, the assignment algorithm may specify a certain number of I/O agents that are assigned. When a certain number of I/O agents is specified, the algorithm assigns one I/O agent per compute node of the world until the required number of I/O agents has been reached. Once the I/O agents are assigned, I/O agent identity information may be stored (step 35). The storing of I/O agent identity information may be done in an array or by any other suitable storage mechanism. By storing the I/O agent identify information, the assignment process may be skipped the next time MPI_file_open( ) is called (decision 32), and the previous I/O agent assignment is used.

After the I/O agent assignment process has completed and the I/O agent information is stored, the file is opened and I/O operations are performed using tasks assigned as I/O agents. The MPI library instantiates I/O worker threads within the tasks assigned as I/O agents (step 36) for servicing I/O requests of the MPI job. As the MPI library receives I/O requests (step 37), the requests are placed in an I/O agent's worker thread. The tasks assigned as I/O agents perform I/O operations in satisfaction of I/O requests using the worker threads of the I/O agents (step 38). Since only tasks that are assigned as I/O agents perform I/O operations, tasks that are not assigned as I/O agents are not disrupted by a requirement to perform I/O operations and are free to perform other operations. Having non I/O agent tasks available becomes particularly beneficial where many I/O operations are being performed or when a large I/O request is made. Each I/O operation on the opened file does not require a new I/O agent assignment. Once tasks are assigned as I/O agents and the file is opened, many I/O operations will generally be performed on the opened file. Although the present invention is illustrated using tasks assigned as I/O agents to perform file I/O operations, similar assignment of I/O agents may be used to perform communication operations such as network I/O operations, or any other I/O operations.

Figure 4:
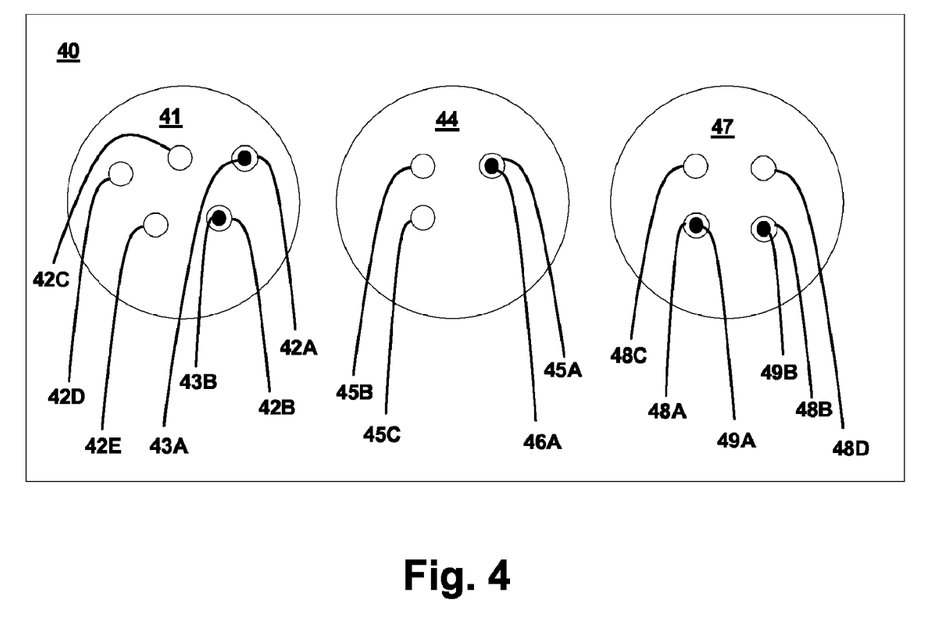
FIG. 4 is a pictorial diagram illustrating a multi-world MPI job 40 executing within a computer system in which techniques according to the embodiments of the present invention are practiced.

Referring now to FIG. 4, an MPI job 40 having multiple worlds, which is one type of dynamic MPI job, is illustrated. In a dynamic MPI job, the number of tasks in the job is not known during the MPI job initialization phase, since the number of tasks in a dynamic MPI job may increase or decrease after execution of the MPI job has begun. In the depicted example, a first world 41 has five tasks 42A-E, a second world 44 has three tasks 45A-C, and a third world 47 has four tasks 48A-D. World 41 has two I/O agents 43A-B, world 44 has one I/O agent 46A, and world 47 has two I/O agents 49A-B. Two of the ways that an MPI job can end up having tasks in multiple worlds are through calls to MPI_Comm_spawn( ), MPI_Comm_accept( )/MPI_Comm_connect( ) or MPI_Comm_join( ). When two worlds are executing independently, a task in one world may call the MPI_Comm_join( ) function to communicate with one task in another world, one or more tasks in one world may call MPI_Comm_accept( ) and one or more tasks in another world may call MPI_Comm_connect( ) to connect to each other. Through the MPI_Comm_spawn( ) library function, a task in one world starts a second world. As a result, the MPI job can encompass tasks that are part of multiple worlds. For example in the illustrated embodiment, one of tasks 42A-E in world 41 may have joined with one of the tasks 45A-C in world 44 and 48A-D in world 47, or one of the tasks 42A-E may have spawned the additional worlds 44 and 47, or any combination of spawning and joining may have been applied. The dynamic instantiation of multiple worlds is not, however, limited to the two methods described above. Further, I/O agents may be assigned from tasks among the several worlds, as illustrated in FIG. 4, or alternatively, all of the I/O agents may be assigned from the tasks in a single world of a multi-world MPI job.

Figure 5:
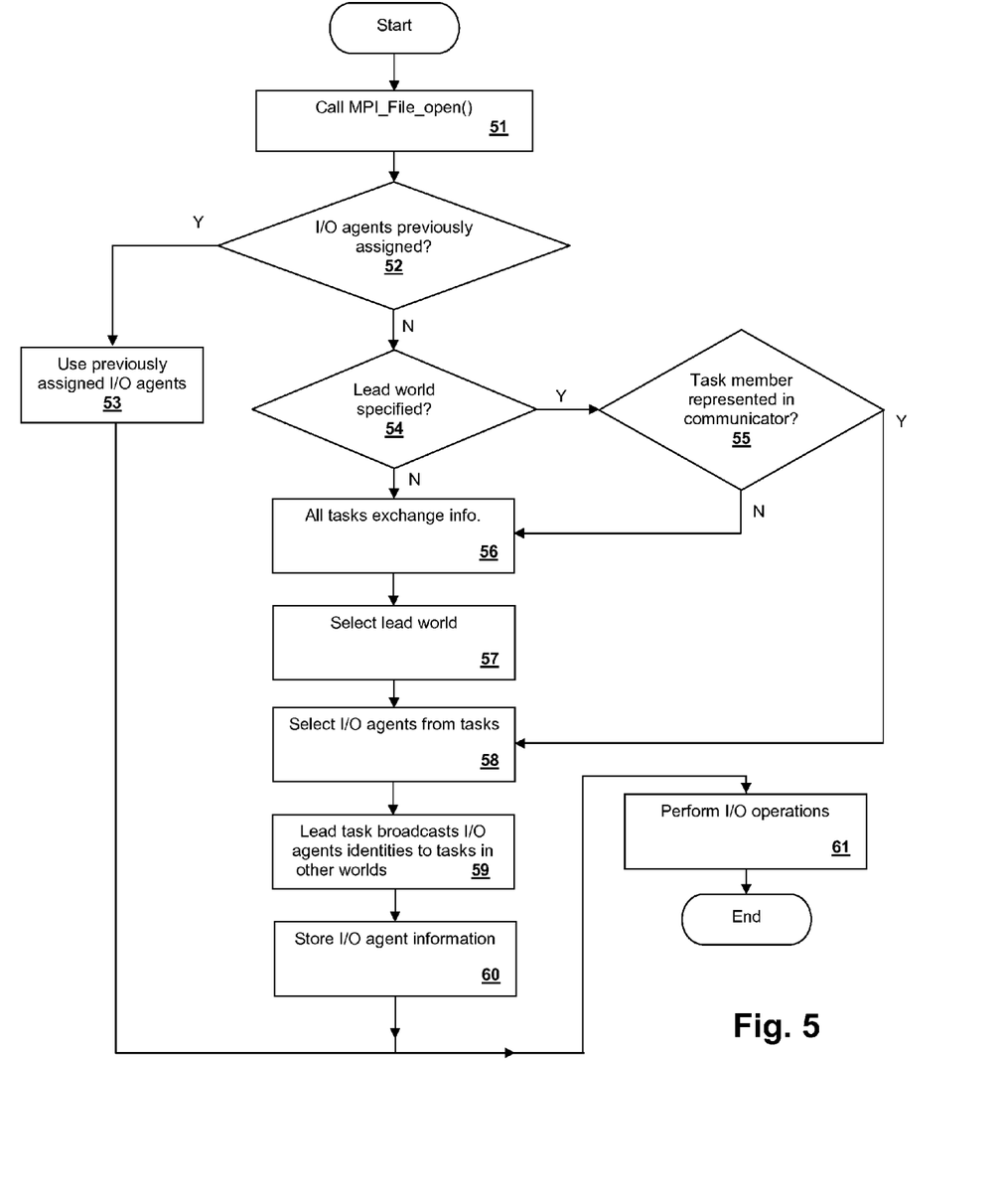
FIG. 5 is a flowchart of a method in accordance with another embodiment of the present invention.

Referring now to FIG. 5, a method in accordance with another embodiment of the present invention is illustrated in a flowchart. Similar to the method depicted in FIG. 3, the method first calls MPI_File_open( ) (step 51). Upon opening the file, the input MPI communicator is checked to determine whether I/O agents have been previously assigned (decision 52). If I/O agents have been previously assigned, then the previously assigned I/O agents may be reused (step 53) and I/O operations are performed (step 61) on the opened file using the tasks previously assigned as I/O agents. If a previous assignment of I/O agents from the information in the input MPI communicator is not present, then a check is performed to determine whether the MPI job has specified a lead world (decision 54). A lead world is a world in which all of the I/O agents of the MPI job are assigned from tasks in the lead world. If the MPI job has specified a lead world, the task distribution information stored in the input communicator is checked to determine whether or not at least one task member of the desired lead world is represented in the input communicator (decision 55). If a task member is present in the MPI communicator, then the I/O agent assignment may proceed using this desired world as the lead world (step 58). If no lead world is specified (decision 54), then all the tasks in the MPI communicator will exchange information with all other tasks, including the task's world ID and the number of compute nodes and tasks in each world (step 56). The exchange of information may be performed via a call to function MPI_Allgather( ). Next, the lead world is selected from the information gathered by the exchange (step 57), the method of which is illustrated in more detail in FIG. 6.

Figure 6:
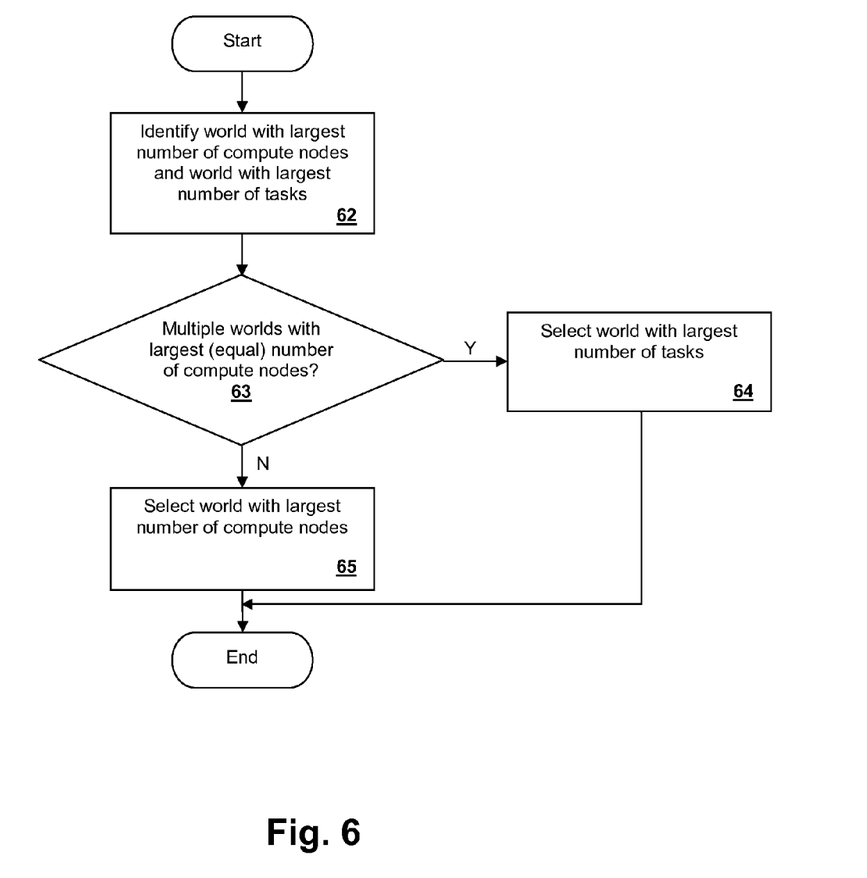
FIG. 6 is a flowchart of a method of selecting a lead world in accordance with an embodiment of the present invention.

In FIG. 6, a method of selecting a lead world that may be used to implement step 57 of FIG. 5 is illustrated. In order to select the lead world, each task determines the world executing on the largest number of compute nodes and the world having the largest number of tasks (step 62) using the information gathered in the exchange (step 56) explained above. If there are multiple worlds with an equal largest number of compute nodes (decision 63), then the world having the largest number of tasks is selected as the lead world (step 64). Otherwise, the world with the largest number of compute nodes is selected as the lead world (step 65). Depending on performance needs, the criteria for selecting the lead world may be modified. For example, the world with the largest number of tasks could be selected as the lead world. In the event that there are multiple worlds with an equal largest number of tasks, then the world with the largest number of compute nodes may be selected as the lead world. However, the selection of the lead world is not limited to the above possibilities. For example, if one I/O agent per compute node is required, then the world with the largest number of compute nodes is selected as the lead world. If all tasks of the current job are to be assigned as I/O agents, then the world with the most number of executing tasks may be selected as the lead world. Alternatively, if a specific number of I/O agents are required, then either the world with the largest number of compute nodes or the world with the largest number of executing tasks may be selected as the lead world, provided that the desired number of I/O agents can be assigned with that lead world. If the required number of I/O agents cannot be directly satisfied by any world of a multi-world MPI job, then a world that provides a closest match to the requirements may be selected as the lead world.

Once the lead world is selected, tasks are assigned as I/O agents as explained above, such as assigning one I/O agent per compute node of the lead world or assigning all tasks of the lead world as I/O agents, or any other suitable method (step 58). After the selection of I/O agents has been made, the lead task, which is the lowest ranking task, of the lead world broadcasts the identity of the I/O agents to all the other executing tasks in the MPI communicator used during the file open operation (step 59). Similar to the method depicted in FIG. 3, the identities of the I/O agents may then be stored in an array or any other suitable means (step 60) to avoid an unnecessary reassignment of the I/O agents. Once a file has been opened and tasks have been assigned as I/O agents, the tasks assigned as I/O agents perform I/O operations in satisfaction of I/O requests initiated by any tasks of the MPI job in the same manner as illustrated in FIG. 3 (step 61). The MPI library starts I/O worker threads within the corresponding tasks assigned as I/O agents and assigns I/O requests from the tasks of the MPI job to the tasks that are assigned as I/O agents. The MPI library may assign I/O requests to the tasks assigned as I/O agents in a round-robin fashion, or using another suitable scheduling method. Then, I/O requests are performed by the tasks assigned as I/O agents. As long as the file remains open and the I/O agent assignment remains active, many I/O operations may be performed on the opened file without any further assignment of I/O agents.

Figure 7:
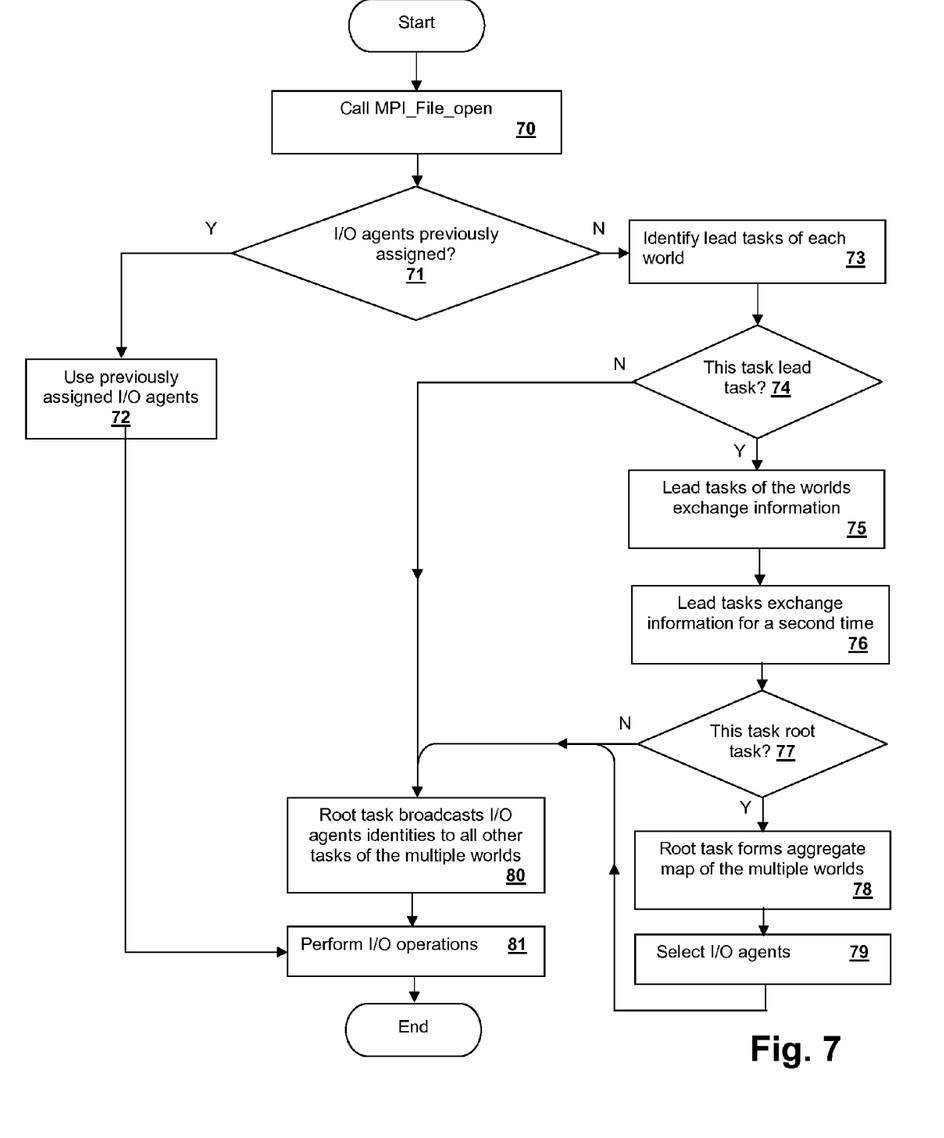
FIG. 7 is a flowchart of a method in accordance with yet another embodiment of the present invention.

FIG. 7 is a flowchart depicting another method of assigning I/O agents in accordance with another embodiment of the invention. Unlike the method illustrated in FIG. 5, in which all of the I/O agents are assigned from a lead world, FIG. 7 illustrates an embodiment of the invention in which I/O agents may be assigned from tasks spread across multiple worlds. MPI_file_open( ) is called (step 70) and a check is then performed to determine whether I/O agents have been previously assigned (decision 71). If so, the previous assignment of I/O agents is used (step 72) and I/O operations can be performed using those agents (step 81). If there is no previous assignment of I/O agents, then all tasks in the world will participate in a lead task selection process to select one lead task for each of the worlds spanning the input communicator. The lead task of a world is the lowest-ranking task among that world's tasks that are active in the input communicator. Each task obtains a list of task IDs for each of the worlds that is active in the current job. Then, by comparing the task ID list of each world with the task ID list of the input communicator, the lead task of each world are identified (step 73). Tasks that are not identified as lead tasks (decision 74), skip to step 80 to wait for the broadcast of the tasks assigned as I/O agents The lead tasks of each world exchange information such as that task's world ID, the number of compute nodes in the world, and the total number of tasks in that world, including tasks that are not active in the input communicator (step 75). The information exchanged in step 75 is used to determine the size and nature of additional information to be communicated about the tasks. Then, the lead tasks exchange the second set of additional information (step 76), the second set of information including task ranks of the world, task sizes for each of the compute nodes of the world, and universe task IDs for tasks of the world. Following the information exchange, the root task, which is the lead task of the lowest ranking world, combines the information received from other lead tasks (step 78) with information about its own task and compute node information, to form an aggregate map of the multiple worlds. The aggregate map of the multiple worlds includes all of the tasks present in the multiple worlds. Tasks other than the root task (decision 77) proceed to step 80 to wait for the root task to broadcast the identities of the tasks assigned as I/O agents. From the aggregate map of the multiple worlds, the root task selects I/O agents (step 79) from tasks in the multiple worlds in a manner similar to that explained above with reference to a single world MPI job. For example, if the algorithm assigns one I/O agent per compute node, then the lowest ranking task of each compute node in the aggregate map of worlds is assigned as an I/O agent. Alternatively, an MPI job may specify that each world in the dynamic MPI job have a specified number of tasks that are assigned as I/O agents. The MPI job may also specify a total number of I/O agents overall, in which case the I/O agents are spread evenly across all the worlds. However, the distribution of I/O agents in multiple worlds is not limited to the above possibilities.

Once the root task selects I/O agents from among all the tasks executing in the multiple worlds, the root task broadcasts the identities of the I/O agents to all the tasks within the input communicator (step 80). Once all the tasks have the set of I/O agent IDs, I/O operations are performed (step 81) in a manner similar to that illustrated in step 61 of FIG. 5. The MPI library instantiates I/O worker threads within the corresponding tasks assigned as I/O agents and receives I/O requests from all tasks of the MPI job. The I/O requests are assigned to the tasks assigned as I/O agents in a round-robin fashion, or using another suitable scheduling method. Then, the I/O requests are performed by the tasks assigned as I/O agents. As long as the file remains open and the I/O agent assignment remains active, many I/O operations may be performed on the opened file without any further assignment of I/O agents.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A computer-performed method for assigning I/O agents in an MPI job using an MPI library, the method comprising:
   generating an instance of a first world having a first group of tasks for execution within a corresponding first group of compute nodes, wherein the first world is a world for executing at least a portion of the MPI job;
   executing the first group of tasks in the first world;
   assigning a subset of the first group of tasks as I/O agents, wherein the subset encompasses less than the total number of tasks of the first group;
   starting I/O worker threads by the MPI library for servicing input/output requests within the corresponding I/O agents, wherein the I/O worker threads execute in tasks assigned as the I/O agents, whereby execution of a remainder of the tasks not assigned as the I/O agents are not disrupted by input/output request operations;
   receiving input/output requests from the MPI library for tasks that are not I/O agents; and
   performing input/output operations in satisfaction of the input/output requests using the worker threads executing in the corresponding I/O agents.

2. The computer-performed method of claim 1, wherein the I/O requests are file I/O requests, and the I/O agents perform the input/output operations in satisfaction of the file I/O requests on a file opened by the MPI job.

3. The computer-performed method of claim 1, further comprising:
   determining whether or not I/O agents have previously been assigned; and
   responsive to determining that I/O agents have been previously assigned, using the previously assigned I/O agents to perform I/O operations in satisfaction of the I/O requests.

4. The computer-performed method of claim 1, wherein the assigning assigns only tasks executing in a single world as I/O agents.

5. The computer-performed method of claim 1, further comprising generating an instance of a second world having a second group of tasks and a second number of compute nodes, wherein the second world is another world for performing tasks in the MPI job, and wherein one of the first world or the second world is dynamically instantiated after tasks in the remaining world have begun execution, and wherein the assigning assigns tasks from among the first world, the second world or both worlds as I/O agents.

6. The computer-performed method of claim 5, further comprising selecting a lead world from among the first and second worlds, and wherein the assigning assigns tasks from only the lead world as I/O agents.

7. The computer-performed method of claim 5, wherein the assigning assigns tasks from both the first world and the second world as I/O agents.

8. A computer system comprising a processor for executing program instructions and a memory coupled to the processor for executing the program instructions, wherein the program instructions include program instructions for assigning I/O agents in an MPI job using an MPI library, wherein the program instructions comprise program instructions for:
   generating an instance of a first world having a first group of tasks for execution within a corresponding first group of compute nodes, wherein the first world is a world for executing at least a portion of the MPI job;
   executing the first group of tasks in the first world;
   assigning a subset of the first group of tasks as I/O agents, wherein the subset encompasses less than the total number of tasks of the first group;
   starting I/O worker threads by the MPI library for servicing input/output requests within the corresponding I/O agents, wherein the I/O worker threads execute in tasks assigned as the I/O agents, whereby execution of a remainder of the tasks not assigned as the I/O agents are not disrupted by input/output request operations;
   receiving input/output requests from the MPI library for tasks that are not I/O agents; and
   performing input/output operations in satisfaction of the input/output requests using the worker threads executing in the corresponding I/O agents.

9. The computer system of claim 8, wherein the I/O requests are file I/O requests, and the I/O agents perform the input/output operations in satisfaction of the file I/O requests on a file opened by the MPI job.

10. The computer system of claim 8, wherein the program instructions further comprise program instructions for:
    determining whether or not I/O agents have previously been assigned; and
    responsive to determining that I/O agents have been previously assigned, using the previously assigned I/O agents to perform I/O operations in satisfaction of the I/O requests.

11. The computer system of claim 8, wherein the program instructions for assigning assign only tasks executing in a single world as I/O agents.

12. The computer system of claim 8, wherein the program instructions further comprise program instructions for generating an instance of a second world having a second group of tasks and a second number of compute nodes, wherein the second world is another world for performing tasks in the MPI job, and wherein one of the first world or the second world is dynamically instantiated after tasks in the remaining world have begun execution, and wherein the program instructions for assigning assign tasks from among the first world, the second world or both worlds as I/O agents.

13. The computer system of claim 12, wherein the program instructions further comprise program instructions for selecting a lead world from among the first and second worlds, and wherein the program instructions for assigning assign tasks from only the lead world as I/O agents.

14. The computer system of claim 12, wherein the program instructions for assigning assign tasks from both the first world and the second world as I/O agents.

15. A computer program product comprising a tangible non-transient computer-readable storage media encoding program instructions for execution within a computer system, wherein the program instructions include program instructions for assigning I/O agents in an MPI job using an MPI library, wherein the program instructions comprise program instructions for:
    executing the first group of tasks in the first world;
    assigning a subset of the first group of tasks as I/O agents, wherein the subset encompasses less than the total number of tasks of the first group;
    starting I/O worker threads by the MPI library for servicing input/output requests within the corresponding I/O agents, wherein the I/O worker threads execute in tasks assigned as the I/O agents, whereby execution of a remainder of the tasks not assigned as the I/O agents are not disrupted by input/output request operations;
    receiving input/output requests from the MPI library for tasks that are not I/O agents; and
    performing input/output operations in satisfaction of the input/output requests using the worker threads executing in the corresponding I/O agents.

16. The computer program product of claim 15, wherein the program instructions further comprise program instructions for:
    determining whether or not I/O agents have previously been assigned; and
    responsive to determining that I/O agents have been previously assigned, using the previously assigned I/O agents to perform I/O operations in satisfaction of the I/O requests.

17. The computer program product of claim 15, wherein the program instructions for assigning assign only tasks executing in a single world as I/O agents.

18. The computer program product of claim 15, wherein the program instructions further comprise program instructions for generating an instance of a second world having a second group of tasks and a second number of compute nodes, wherein the second world is another world for performing tasks in the MPI job, and wherein one of the first world or the second world is dynamically instantiated after tasks in the remaining world have begun execution, and wherein the program instructions for assigning assign tasks from among the first world, the second world or both worlds as I/O agents.

19. The computer program product of claim 18, wherein the program instructions further comprise program instructions for selecting a lead world from among the first and second worlds, and wherein the program instructions for assigning assign tasks from only the lead world as I/O agents.

20. The computer program product of claim 18, wherein the program instructions for assigning assign tasks from both the first world and the second world as I/O agents.

* * * * *